(12) United States Patent
Spencer

(10) Patent No.: US 10,541,521 B1
(45) Date of Patent: Jan. 21, 2020

(54) HOUSING ASSEMBLY

(71) Applicant: Sigma Innovations LLC, Jackson, OH (US)

(72) Inventor: Craig Michael Spencer, Jackson, OH (US)

(73) Assignee: Sigma Innovations LLC, Jackson, OH (US)

( * ) Notice: Subject to any disclaimer, the term of this patent is extended or adjusted under 35 U.S.C. 154(b) by 0 days.

(21) Appl. No.: 16/112,659

(22) Filed: Aug. 25, 2018

(51) Int. Cl.
| | |
|---|---|
| *B23P 19/00* | (2006.01) |
| *H05K 13/04* | (2006.01) |
| *H02G 3/08* | (2006.01) |
| *H02G 3/14* | (2006.01) |

(52) U.S. Cl.
CPC ............... *H02G 3/085* (2013.01); *H02G 3/14* (2013.01)

(58) Field of Classification Search
CPC ................................. H02G 3/085; H02G 3/14
See application file for complete search history.

(56) References Cited

U.S. PATENT DOCUMENTS

| | | | |
|---|---|---|---|
| 7,968,806 B2 | 6/2011 | Shelton | |
| 2012/0282124 A1* | 11/2012 | Bingham | F01C 21/10 417/423.14 |
| 2017/0102308 A1* | 4/2017 | Gillette, II | G01N 11/00 |

OTHER PUBLICATIONS

Online retail catalog of enclosed relays from https://www.rexelusa.com, 1 file, made Oct. 27, 2018.
Online retail catalog of enclosed relays from https://www.platt.com, 2 files, made Oct. 27, 2018.
Online retail catalog of enclosed relays from https://www.energycontrol.com, 1 file, print made Oct. 27, 2018. (Please refer to their web site for a full catalog. The site is not configured to print complete catalogs.).
Online manufacturer's catalog of enclosed relays from https://www.functionaldevices.com, 1 file, made Oct. 27, 2018.
Online manufacturer's catalog of enclosed relays from https://www.veris.com, 1 file, print made Oct. 27, 2018. (Please refer to their web site for a full catalog. The site is not configured to print complete catalogs.).
Online manufacturer's catalog of enclosed relays from http://www.corecomponents.com, 1 file, made Oct. 27, 2018.

* cited by examiner

*Primary Examiner* — Paul D Kim
(74) *Attorney, Agent, or Firm* — Thomas E. Lees, LLC

(57) ABSTRACT

A housing assembly is adapted for housing fully pre-wired printed circuit boards populated with diverse electrical components. The housing assembly includes multiple nipples and an optimized geometry for mounting to or mounting within commonly available conduit-related fixtures in a variety of installation configurations. These installation configurations allow for simpler wire routing where voltage separation is required, for greater accessibility to gang junction box cover plates on gang junction boxes to which the housing assembly is mounted, and for more installation options for wide range of common gang junction boxes as compared to existing housings.

5 Claims, 8 Drawing Sheets

HOUSING ASSEMBLY

FIELD OF THE INVENTION

This invention relates, in general, to building automation control systems and, more particularly, to housings, which house pre-wired printed circuit board assemblies populated with diverse components, adapted to be mounted on or mounted within conduit-related fixtures.

BACKGROUND OF THE INVENTION

Building automation products in industrial and commercial buildings perform a variety of tasks from regulating temperature to closing down ventilation systems during fires. Building automation products typically accomplish this by controlling power supplied to various equipment, such as motors and heating elements. Controlling a power supply can be accomplished through power modulation, but more commonly controlling a power supply is accomplished though a binary on-off operation.

Further, building automation products in industrial and commercial buildings are typically comprised of a control system and a distribution of numerous diverse apparatus, such as sensors and relays. These apparatus are typically comprised of housing assemblies which house printed circuit board assemblies. Such a printed circuit board assembly typically includes a printed circuit board populated with diverse components. Such a printed circuit board assembly may comprise either a single electrical circuit or multiple electrical circuits.

Printed circuit boards come in a variety of types. The types of printed circuit boards are similar to each other in the senses of being made from a substrate of suitable dielectric strength for an intended application voltage and of incorporating conductive pathways known as traces used to make circuits. Within those circuits, the traces electrically connect one location to another and may thereby be used to make connections to diverse components which are populated on the printed circuit board.

A small sampling of possible diverse components often populated on printed circuit boards include resistors, capacitors, inductors, electromechanical relays, diode bridges, light-emitting diodes (LEDs), etc.

A common example of a fully pre-wired printed circuit board assembly application related to building automation products is an emitter-follower voltage regulator circuit allowing for a range of control signal voltages (typically 10-30 volts either direct current (DC) or alternating current (AC), and up to AC line-to-neutral voltage through an additional resistor-capacitor circuit leg prior to a diode bridge) to energize an electromagnetic relay coil using rectified DC. When an electromagnetic relay coil is energized with sufficient electrical current, typically a switch (referred to as a pole) is activated inside the electromagnetic relay which makes an electrical contact, breaks an electrical contact, or both makes an electrical contact and breaks an electrical contact. An electrical contact affected by activation of the pole is referred to as a throw. Some electromagnetic relays comprise a plurality of throws. Further, some electromagnetic relays comprise a plurality of poles. Common electromagnetic relays used in the example application are either single-pole single-throw electromagnetic relays or single-pole double-throw electromagnetic relays, but other electromagnetic relays may be used. Usually for the example application, a light-emitting diode (LED) extends from the printed circuit board, and the LED illuminates when sufficient voltage is applied across the electromagnetic relay coil such that a sufficient electrical current will flow through the electromagnetic relay coil to activate the pole. Further, usually for the example application, there are at least two different sets of wires coupled to the printed circuit board. These sets of wires interface with circuits comprised in the printed circuit board assembly. In the example application, a first set of wires interface with the emitter-follower voltage regulator circuit, and a second set of wires interface with an electromagnetic relay electrical contact circuit. Additional circuits, wires, sets of wires, LEDs, and other components may be included in the printed circuit board assembly for additional utilities, such as for indicating load-side current.

Typical voltage ratings of the electromagnetic relay electrical contact circuit used in the example application noted above are either 277 volts AC or 480 volts AC.

BRIEF SUMMARY OF THE INVENTION

The invention is an improved housing assembly adapted to be mounted to or to be mounted within conduit-related fixtures. Further, the improved housing assembly is adapted to house fully pre-wired printed circuit board assemblies. Moreover, the improved housing assembly includes multiple nipples, each including an orifice, and an optimized geometry which permits mounting in a variety of configurations. The improved housing assembly allows for simpler wire routing where segregation of different sets of wires is desired, for greater accessibility to gang junction box cover plates on gang junction boxes to which the improved housing assembly is mounted, and for installation in a manner ranging from substantially outside to substantially inside to completely inside of a wide range of common gang junction boxes.

DETAILED DESCRIPTION OF THE INVENTION

Figure 1:
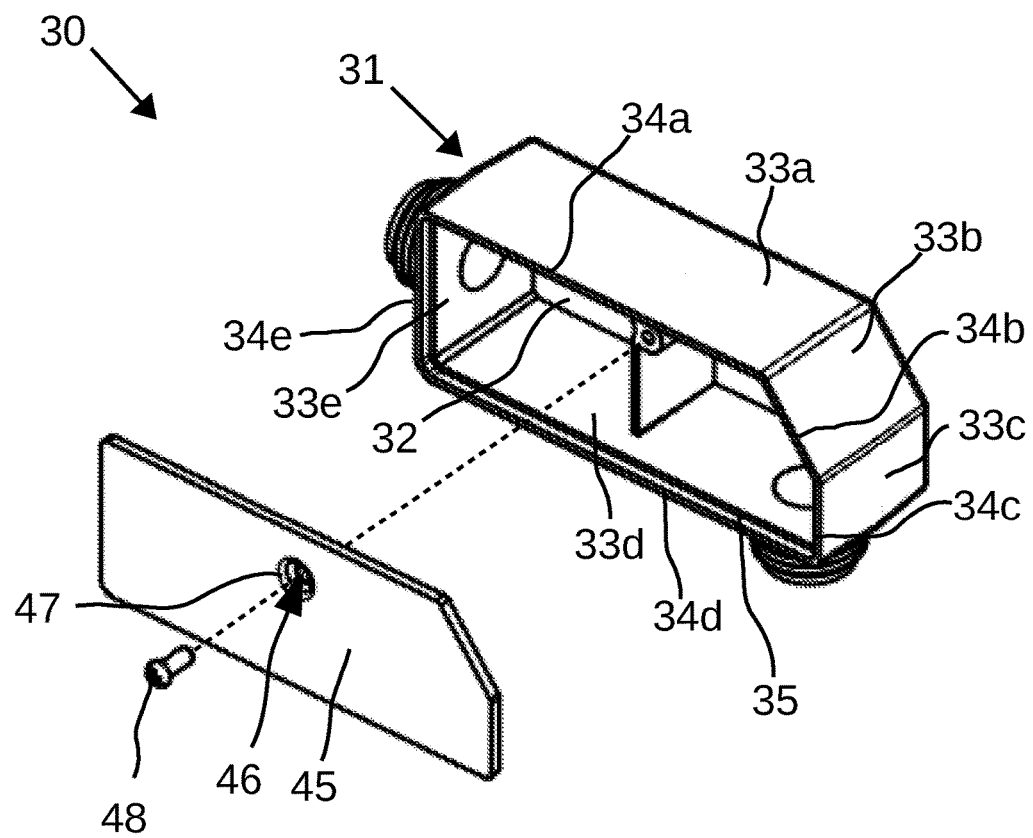
FIG. 1 is a perspective exploded assembly view of an exemplary version of improved housing assembly.

The following is a description of embodiments of the invention as visualized by the inventor, with reference to the above listed drawings where similar parts are identified by like reference numerals.

The invention is an improved housing assembly adapted for housing a fully pre-wired printed circuit board assembly. The improved housing assembly is further adapted to be mounted on or to be mounted within conduit-related fixtures.

Conduit-related fixtures include a diverse family of equipment used to house wiring and connections made with that wiring, including but not limited to conduit tubes, conduit bodies, junction boxes (also known as outlet boxes), electrical enclosures, terminal enclosures, and electrical cabinets adapted for interfacing with other conduit-related fixtures. Generally for conduit-related fixture installations, wires route to different locations inside of conduit tubes. Conduit tubes may be rigid or flexible. Conduit tubes may be made from such materials as coated steel, stainless steel, galvanized steel, aluminum, polyvinyl chloride, and other application-dependent materials. Different conduit-related fixtures, such as a conduit body or a junction box, may be employed to form a union of two or more conduit tubes. Depending on a particular conduit tubing, a particular conduit-related fixture to which it is adjoined, and a particular application, additional hardware may be required to couple a conduit tube to a conduit-related fixture (e.g. lock nuts, set screws, compression fittings, etc.).

Housing assemblies commonly mount to particular conduit-related fixtures known as gang junction boxes. A gang junction box is a junction box classified by gang quantities, where a gang refers to an adaptation for a component such as a switch or receptacle. Gang junction boxes may be adapted to fit multiple components, and thus a numeric prefix is assigned to designate the quantity of accommodation (e.g. a 1-gang junction box is adapted for a single component, a 2-gang junction box is adapted for two components, etc.). Despite the gang quantity designation being associated with component adaptations, gang junction boxes are often utilized without any components being installed into them, serving instead as locations to make wire connections, to assist in wire accessibility for routing, or to act as unions for conduit tubes. Gang junction boxes are often but not always rectangular-box-like in shape. Moreover, gang junction boxes typically comprise a back panel with integral side panels extending nominally perpendicular from edges of the bottom panel to form a cavity. Further, gang junction boxes usually include perforations on their side panels where round panel pieces, known as knockouts, can be easily removed. A hole in a side panel created when a knockout is removed may be referred to as a knockout hole. In such gang junction boxes, conduit-related fixtures are typically connected to the gang junction boxes through knockout holes created by removal of particular knockouts. Gang junction boxes are typically designed to be firmly mounted to a surface such as a wall, ceiling, floor, or other suitable rigid structure by installing one or more screws through holes in the back panel of a gang junction box and into the surface.

Referencing FIG. 1, the improved housing assembly 30 comprises two parts: a base 31 and a lid 45. These parts may be made from a plastic injection molding process utilizing a fire-retardant blend of plastic of an appropriate rating as required for typical applications. The base 31 is rectangular-box-like in nature, having a bottom panel 32 with integral side panels 33a-e extending nominally perpendicular from edges of the bottom panel 32 to form a cavity. Within the present description, a reference to interior of the base 31 refers to the side of the base 31 located in the cavity, and a reference to exterior of the base 31 refers to the side of the base 31 located out of the cavity. In some embodiments a recessed lip 35 is included in tops 34a-e of the side panels 33a-e. In some embodiments a height of the base 31 from the bottom panel 32 to the tops 34a-e of the side panels 33a-e is up to 35.7 mm (1 13/32 inches). In some embodiments an assembly screw 48 inserted into a through hole 46 in the lid 45 may be used to attach the lid 45 to the base 31 as will be described later. In some embodiments the shape and thickness of the lid 45 is such that it will fit inside of the base's recessed lip 35 and be nominally flush with the tops 34a-e of the side panels 33a-e. In some embodiments the lid 45 is relatively flat with the exception of a recess pocket 47 for receiving a screw head on an outer surface of the lid and an appropriate extrusion on the opposite side of the lid 45 to provide appropriate structural support for force exerted by an assembly screw 48. In some embodiments the through hole 46 is centered in the recess pocket 47 for receiving the assembly screw 48.

As shown on FIG. 1, in some embodiments the base 31 further comprises a first side panel 33a coupled to an orthogonal second side panel 33c through a substantial chamfer formed by a third side panel 33b. This substantial chamfer facilitates mounting the improved housing assembly 30 within certain common-sized 2-gang junction boxes. Such a chamfer may be incorporated into other panels of the base 31 in some embodiments of the improved housing assembly 30. Multiple such substantial chamfers may be included in the base to couple additional panels in some embodiments.

Figure 2:
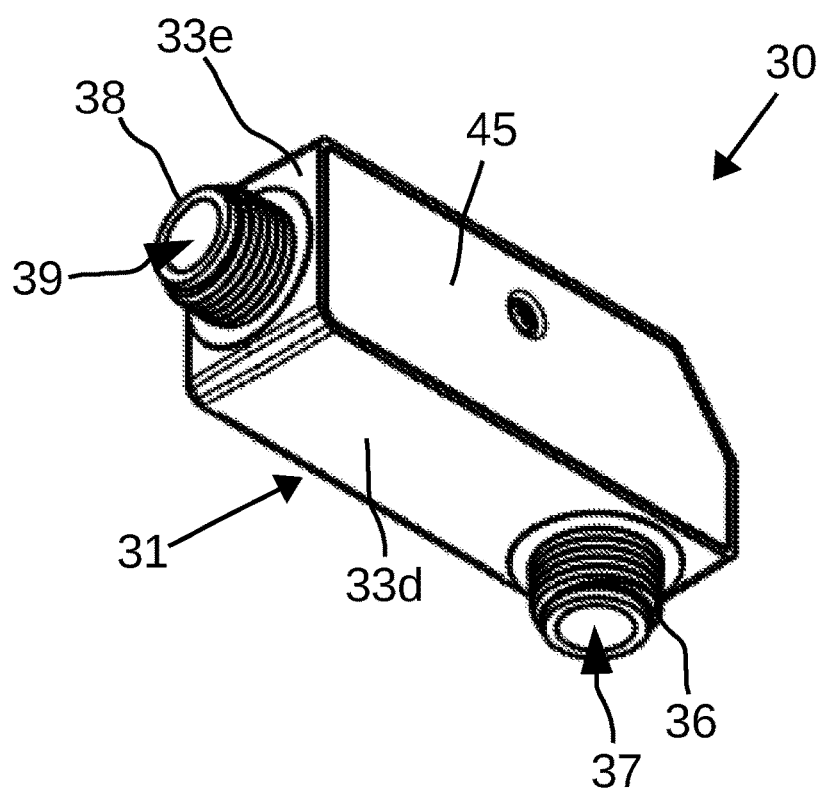
FIG. 2 is a perspective view of the improved housing assembly of FIG. 1, showing the lid assembled to the base.

FIG. 2 depicts how some embodiments of the improved housing assembly 30 would appear with the lid 45 attached to the base 31. The base 31 further comprises a first nipple 36 included in a select panel and a second nipple 38 included in a select panel.

Referencing FIG. 2, in some embodiments the first nipple 36 is included in the side panel designated as 33d, The first nipple 36 includes an orifice 37. In some embodiments the first nipple 36 is included in the side panel designated as 33d, and the location of the first nipple 36 is biased away from the side panel designated as 33e. In some embodiments the first nipple 36 is located on side panel 33d such that when the first nipple 36 is inserted into a knockout hole created by removing a first knockout on a side of a triple-knockout-per-side 2-gang junction box, the side panel designated as 33e is nominally flush with a 2-gang junction box side orthogonal to the side where the nipple is inserted into the 2-gang junction box. Referencing FIGS. 1 & 2, in some embodiments a height of centerline of the first nipple 36 from the bottom panel 32 of the base 31 is up to 17.5 mm (11/16 inches). In some embodiments the first nipple is threaded with 12.7 mm (½ inch) American National Standard Taper Pipe Threads.

Referencing FIG. 2, in some embodiments the second nipple 38 is included in the side panel designated as 33e. The second nipple includes an orifice 39. Referencing FIGS. 1 & 2, in some embodiments a height of centerline of the second nipple 38 from the bottom panel 32 of the base 31 is up to 17.5 mm (11/16 inches). In some embodiments the second nipple is located laterally centered on the side panel designated as 33e. In some embodiments the second nipple is threaded with 12.7 mm (½ inch) American National Standard Taper Pipe Threads.

The locations of the first nipple and of the second nipple may be changed to other positions on the above-designated side panels or to other panels of the base for a particular design. Having a relatively long distance between the two nipples allows for easier mounting onto two different gang junction boxes which have already been mounted to a surface, and so such a consideration is correspondingly exhibited in the above-described embodiment.

In some embodiments the first nipple, the second nipple, or both may be included in the lid instead of the base. Having both the first nipple and the second nipple in the base allows for a simplified design of any molds utilized in an injection molding process to produce the base and the lid, and so such a consideration is correspondingly exhibited in the above-described embodiment by having nipples located only in the base.

Furthermore, additional nipples beyond the two nipples identified above may be included in either the base or the lid to suit particular applications. Having more than two nipples increases the likelihood that the improved housing assembly 30 would be required to be installed at the same time as when conduit-related fixtures are mounted due to potential insertion limitations when mounting the improved housing assembly to the conduit-related fixtures. Such limitations include reduced maneuverability of the improved housing assembly during the mounting process due to dimensional interference and inability to simultaneously insert more than two nipples into conduit-related fixtures when each nipple is aligned to a different direction. Such consideration is correspondingly exhibited in the above-described embodiment having only two nipples.

Figure 3:
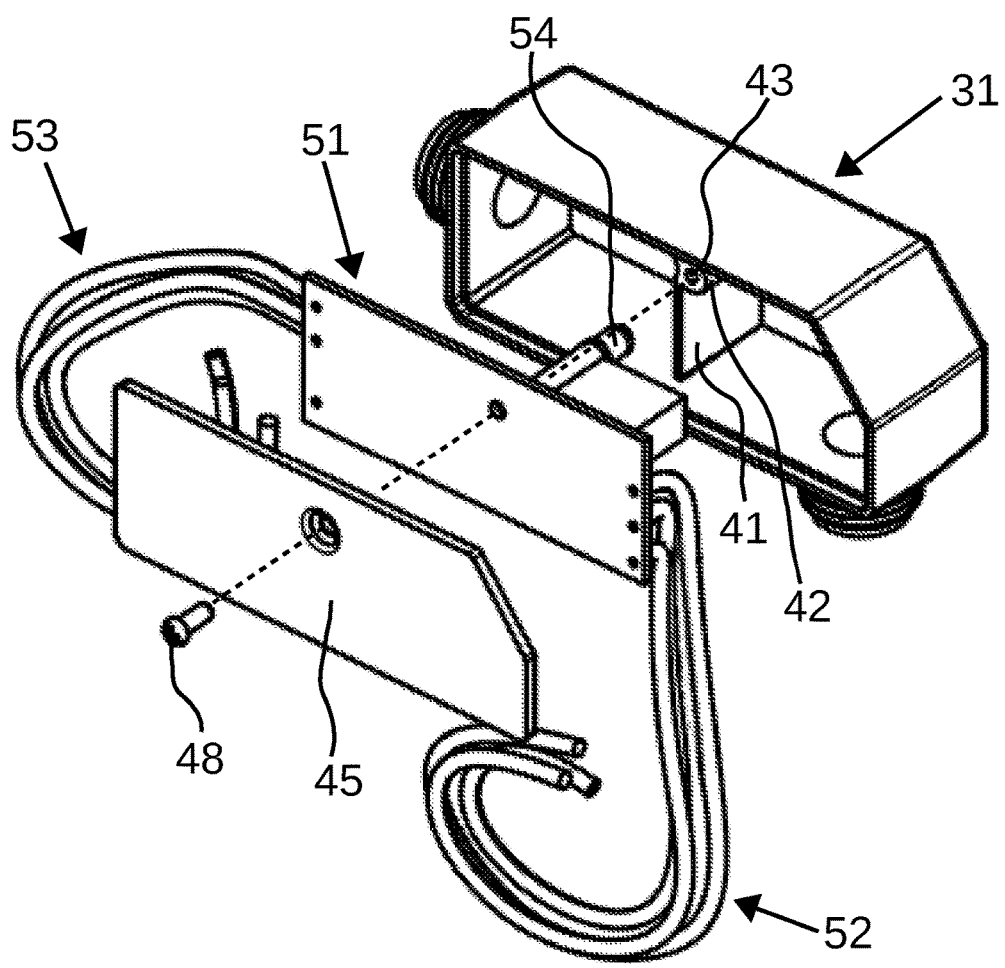
FIG. 3 is a perspective exploded assembly view of the improved housing assembly of FIG. 1, including an exemplary constituent fully pre-wired printed circuit board assembly to be housed within the improved housing assembly.

Referencing FIG. 3, the base 31 further comprises a support rib 41 with an integral post 42 which includes a blind hole 43 for receiving an assembly screw 48.

The configuration of the support rib 41 or the post 42 or the blind hole 43 may be adapted as necessary for interfacing with particular fully pre-wired circuit board assemblies 51 or for employing different methods of securing the lid 45 to the base 31. Such adaptations may include but are not limited to their removal, multiplication, or relocation.

FIG. 3 includes an example of a fully pre-wired circuit board assembly 51 which may be housed in the improved housing assembly. Such a fully pre-wired circuit board assembly 51 typically includes at least two sets of wires (depicted as 52 and 53 respectively). An example application having such sets of wires on a fully pre-wired circuit board assembly 51 is an electromagnetic relay application where a first set of wires 52 is associated with energizing a coil within an electromagnetic relay (which is included in the printed circuit board assembly) and a second set of wires 53 is associated with contacts of the electromagnetic relay. In the example application, the first set of wires 52 is referred to as a control set, with the wires of that set being known as control wires. Control wires are integral to a circuit which interfaces with a control system to perform a function which is typically associated with controlling equipment. Such a circuit including control wires may be referred to as a control circuit. Furthermore, in the example application, the second set of wires 53 is referred to as load set, with the wires of that set being known as load wires. Load wires are integral to a circuit which interfaces with equipment being controlled by the control system. Such a circuit including load wires may be referred to as a load circuit. Typically, a control circuit will have a different power rating than a load circuit. Depending on a particular application and on differences of power ratings between the control circuit and the load circuit, certain regulatory standards (e.g. National Electric Code (NEC), Canadian Electric Code (CEC), etc.) may consider the control circuit and the load circuit to have different power circuit classifications (e.g. Class 1 for the control circuit and Class 2 for the load circuit per NEC). The example fully pre-wired circuit board assembly 51 comprises an indicating LED 54.

Figure 4:
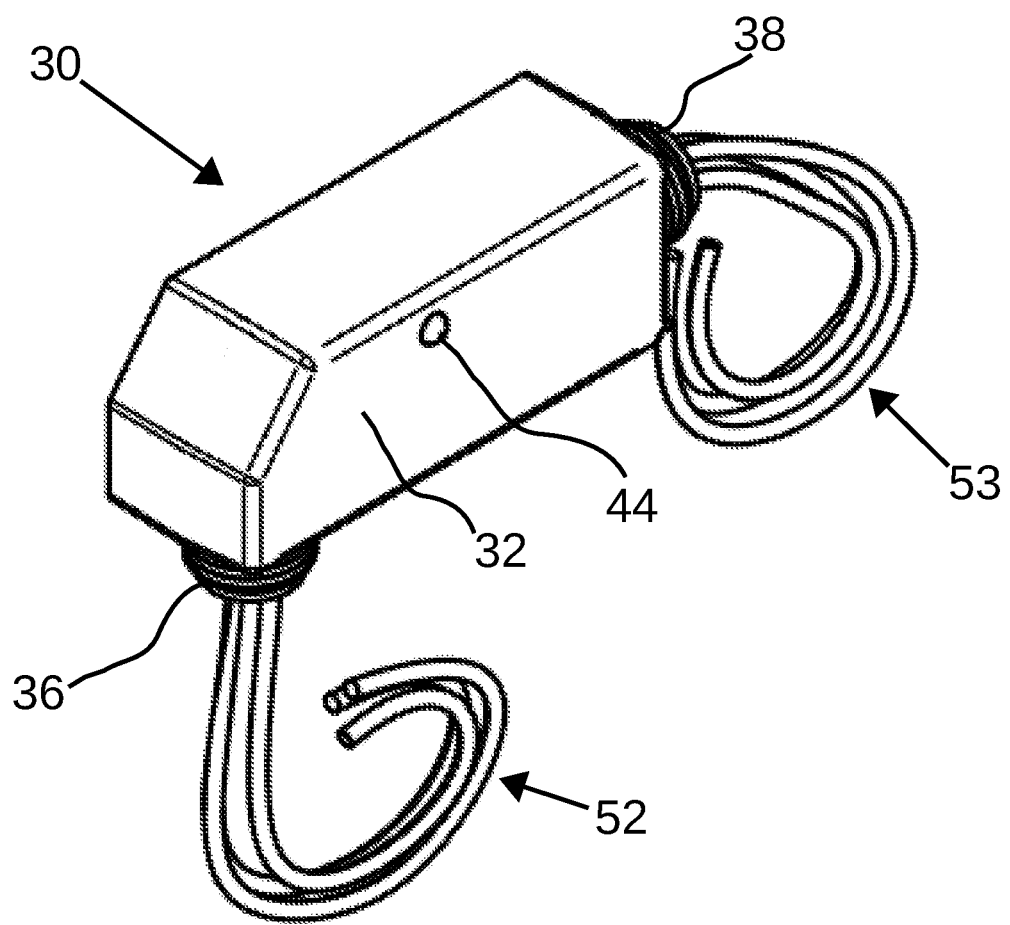
FIG. 4 is a perspective view of the improved housing assembly of FIG. 1 fully assembled, including an exemplary constituent fully pre-wired printed circuit board assembly.

Referencing FIG. 4, the first set of wires 52 and the second set of wires 53 originating from the exemplary fully pre-wired printed circuit board assembly housed within the improved housing assembly are routed out of the improved housing assembly through the orifice in the first nipple 36 and the orifice in the second nipple 38 respectively. In some embodiments the bottom panel 32 comprises a through hole 44 to allow an indicating LED originating from the fully pre-wired printed circuit board assembly to protrude through the bottom panel 32.

In various embodiments of the improved housing assembly, other through holes may be included in select panels in the base or in the lid to accommodate additional indicating LEDs or other user interface devices (e.g. switches, dials, etc.). In other embodiments of the improved housing assembly, no such-purposed through holes are included in the base or in the lid.

Figure 5:
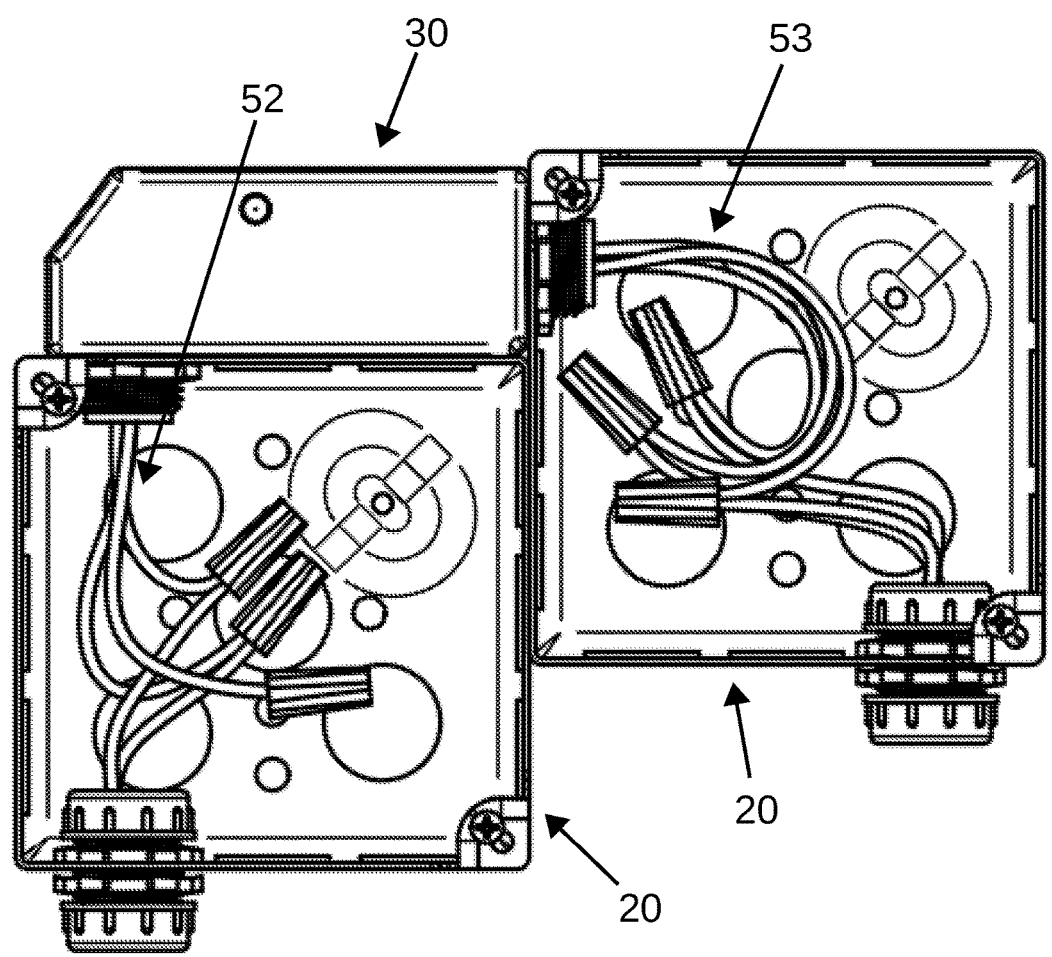
FIG. 5 is an elevation view depicting the fully assembled improved housing assembly of FIG. 4 in an installation where segregation of different sets of wires is desired.

Referencing FIGS. 4 & 5, the improved housing assembly 30 is adapted for housing a fully pre-wired printed circuit board assembly. There are typically a plurality of wires originating from such a fully pre-wired printed circuit board assembly, and usually these wires can be grouped into at least two sets of wires (represented as 52 and 53 respectively). A set of wires may contain a quantity of wires ranging from one wire to the total plurality of wires originating from the fully pre-wired printed circuit board assembly. These wires are typically identified by a color code on each respective wire and an associated wiring diagram included in such a product's documentation. The improved housing assembly 30 comprises at least two nipples. Each nipple in the improved housing assembly includes an orifice through which wires originating from the fully pre-wired printed circuit board assembly may be routed. Likewise, this allows for different sets of wires (represented as 52 and 53 respectively) to be routed out of different orifices included in different respective nipples in the improved housing assembly 30. Such a configuration may be desirable from a design aesthetics perspective. Further, such a configuration may be desirable to segregate sets of wires originating from the fully pre-wired printed circuit board assembly, especially when those sets of wires have different power circuit classifications. For such an application where those sets of wires have different power circuit classifications and it is desired to segregate sets of wires having different power circuit classifications, a plurality of nipples and their respective orifices included in an embodiment of the improved housing assembly may be located in a way such that separate conduit-related fixtures may be employed for mounting each nipple of the improved housing assembly, and such an embodiment may thereby be used to help ensure that connections of wires having different power circuit classifications be made in separate enclosures. Such a configuration is illustrated in an example installation in FIG. 5. In contrast, currently existing housing assemblies for fully pre-wired circuit board assemblies have only one nipple with an orifice through which all wires are routed for external connection.

Figure 6:
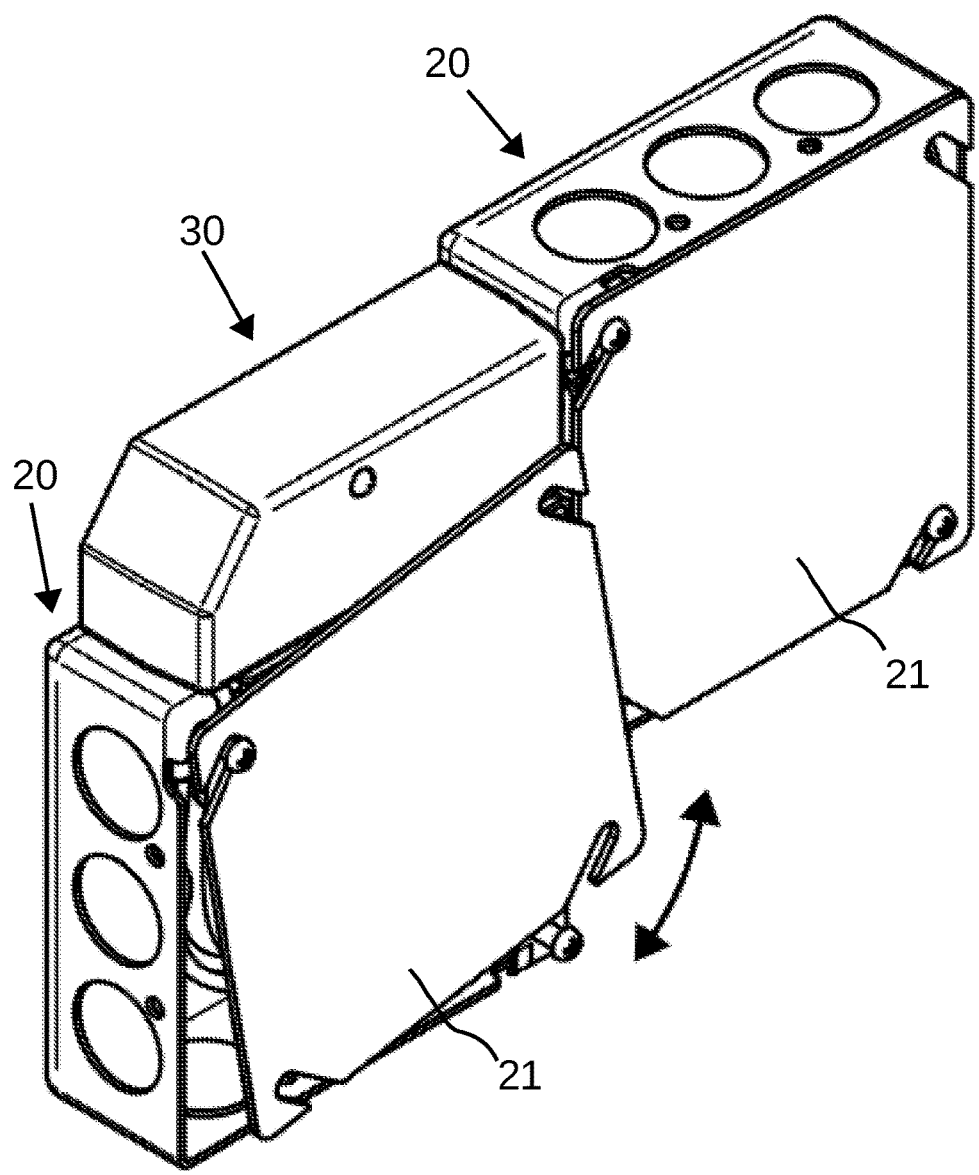
FIG. 6 is a perspective view of the fully assembled improved housing assembly of FIG. 4 mounted to two common-sized 2-gang junction boxes with a gang junction box cover plate partially removed to demonstrate access for gang junction box cover plate removal and swivel clearance of a gang junction box cover plate afforded by the improved housing assembly.

Referencing FIG. 6, some embodiments of the improved housing assembly 30 comprise a limit to the distance from the bottom panel of the base to centerline height of both nipples of up to 17.5 mm (11/16 inches) as noted above. While there are a plethora of variations in gang junction box designs, metallic 2-gang junction boxes with nominal side dimensions of 101.6 mm (4 inches) by 101.6 mm (4 inches) are exceptionally common in building automation installations. Depth of these metallic 2-gang junction boxes varies by product, but common depths vary from 38.1 mm (1½ inches) to 54.0 mm (2⅛ inches) from bottom panel to tops of side panels. Knockouts in the metallic 2-gang junction box sides are typically placed with knockout hole centerlines matching one half of the depth of the box, but some drawn versions of the boxes have a bias away from the bottom panel, making the knockout hole centerlines as close as 17.5 mm (11/16 inches) from the top of the side panels. So common knockout hole centerlines range in height from 17.5 mm (11/16 inches) to 27.0 mm (11/16 inches) from the tops of the side panels of these metallic 2-gang junction boxes. Referencing FIG. 6, when housing assemblies for fully pre-wired printed circuit board assemblies are mounted to gang junction boxes 20, they are mounted with their bottom panels facing away from a surface to which the gang junction boxes are mounted. With the limited distance from the bottom panel of base to nipple centerline height comprised of the improved housing assembly 30 as noted above, the bottom panel will be flush or less than flush relative to common metallic 2-gang junction boxes to which the improved housing assemblies 30 are mounted. Such a configuration permits unrestricted approach access for gang junction box cover plates 21 and permits flush-mounted features for all of the common gang junction box with depths of 38.1 mm (1½ inches) or more. Further, such a configuration allow installation of flush mounted features which extend beyond side edges of the gang junction boxes onto the gang junction boxes, such as cosmetic face plates. FIG. 6 illustrates the ability to freely swing a gang junction box cover plate 21 over the improved housing assembly 30 when mounted to such gang junction boxes.

In contrast, currently existing housing assemblies have nipple centerline heights from base bottom panels on the order of 22.9 mm (9/10 inches) or more. Accordingly, when the these existing housing assemblies are mounted to gang junction boxes 20, the existing housing assembly bottom panels project a distance of 22.9 mm (9/10 inches) or more from centerline of knockout holes in the gang junction boxes away from surfaces to which the gang junction boxes are installed. For certain common 2-gang junction boxes, this projection will exceed flush level of the 2-gang junction box by over 5.1 mm (⅕ inches) when mounted to such a gang junction box.

Figure 7:
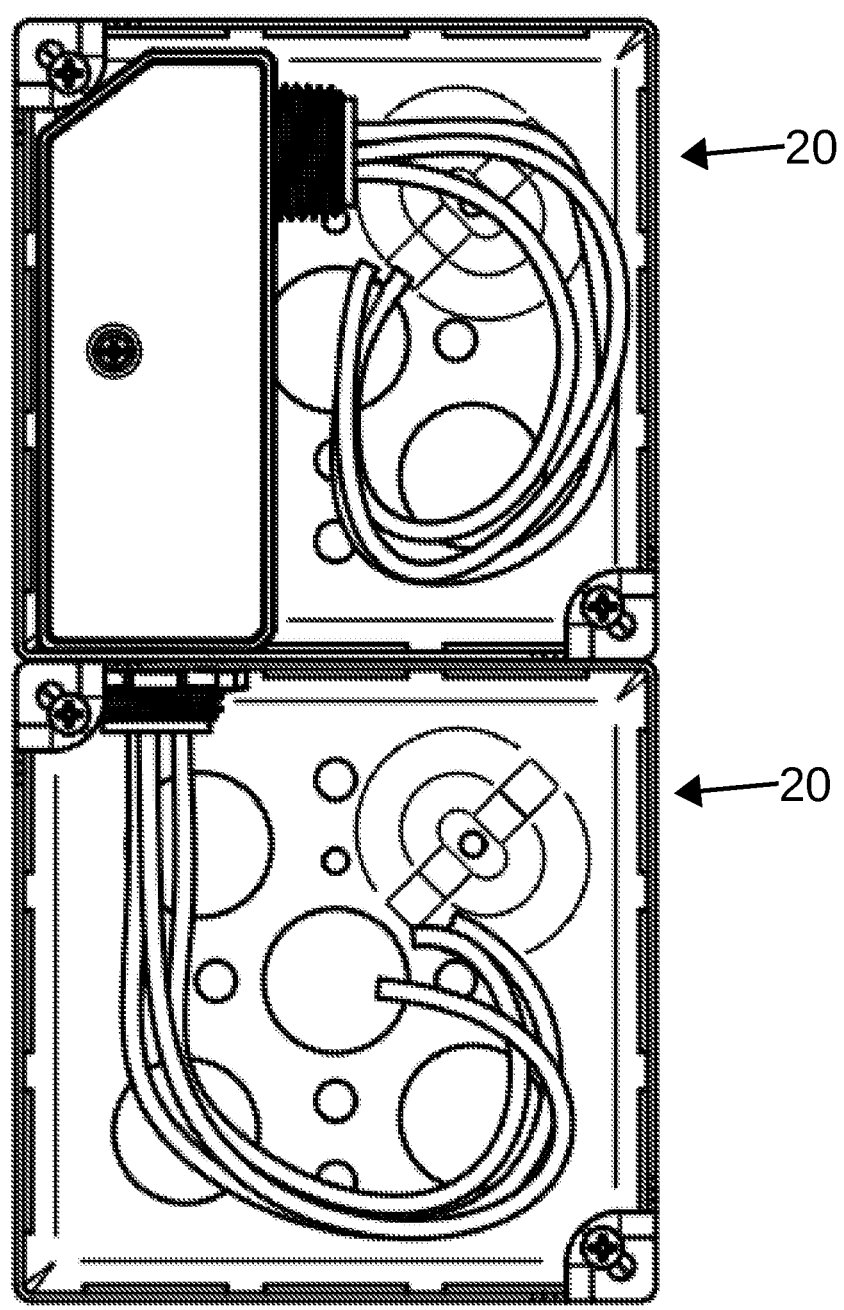
FIG. 7 is an elevation view of the fully assembled improved housing assembly of FIG. 4 mounted substantially within a first common-sized 2-gang junction box, with one nipple protruding through the first 2-gang junction box and into a second 2-gang junction box to illustrate an additional installation configuration afforded by the improved housing assembly.

Depth of gang junction boxes varies by product, but common gang junction boxes vary from 38.1 mm (1½ inches) to 54.0 mm (2⅛ inches) from bottom panel to top of side panels. The thickness of the gang junction box panels, including the bottom panel, may also vary by product, but thicknesses on the order of 1.5 mm (0.060 inches) to 2.0 mm (0.080 inches) are common. In consideration of that thickness, the internal depth of the most shallow common gang junction box is less than 36.5 mm (1 7/16 inches). Furthermore, other common geometric features within the gang junction box interiors, such as raised knockouts and corner fillet radii, can further reduce the available internal depth. As noted earlier, some embodiments of the improved housing assembly comprise a limit to the height of the base of up to 35.7 mm (1 13/32 inches). Further, some embodiments of the base have a side panel forming a substantial chamfer to couple two orthogonal side panels. These adaptations allow for the improved housing assembly to fit wholly into a cavity of a common gang junction box with a depth of 38.1 mm (1½ inches) or more and a suitable cavity volume. Additionally, combined with the aforementioned nipple centerline height restriction of up to 17.5 mm (11/16 inches) in some embodiments of the improved housing assembly, one nipple may be passed through a knockout hole in a gang junction box side panel while a remainder of the improved housing assembly is completely inside the gang junction box volume. Such a configuration may be desired for obscuring the improved housing assembly from sight for aesthetics, for security, or for better protection of the improved housing assembly from the environment. FIG. 7 illustrates such an installation.

In contrast, existing housing assemblies have base heights on the order of 38.1 mm (1½ inches) or more from the bottom panel to the top of the integral side panels and nipple centerline heights from base bottom panels on the order of 22.9 mm (9/10 inches) or more.

Figure 8:
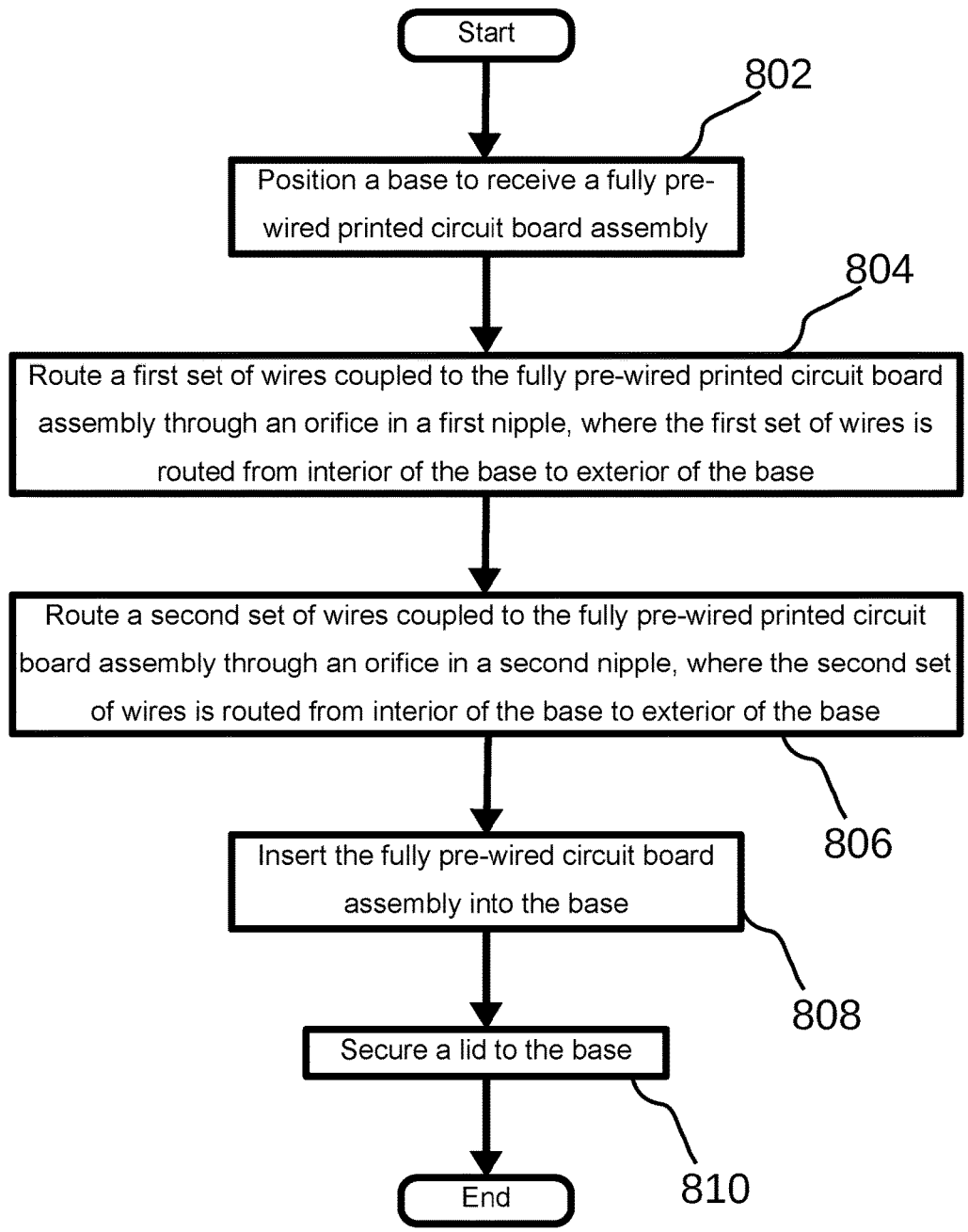
FIG. 8 is a flow chart of the method of assembling the fully assembled improved housing assembly of FIG. 4.

Referencing FIG. 8, a method for fully assembling the improved housing assembly 30 is as follows:

At 802, a user positions base 31 to receive a fully pre-wired printed circuit board assembly 51 by setting the base 31 on its bottom panel 32 on a working surface.

At 804, the user routes a first set of wires 52 coupled to the fully pre-wired printed circuit board assembly 51 through an orifice 37 in a first nipple 36, where the first set of wires 52 is routed in the direction from interior of the base 31 to exterior of the base 31.

At 806, the user routes a second set of wires 53 coupled to the fully pre-wired printed circuit board assembly 51 through an orifice 39 in a second nipple 38, where the second set of wires 53 is routed from interior of the base 31 to exterior of the base 31.

At 808, the user inserts the fully pre-wired circuit board assembly 51 into a cavity in the base 31.

At 810, the user secures a lid 45 to the base 31 by placing the lid 45 into to a recessed lip 35 in the base 31. Then, the user inserts a self-tapping assembly screw 48 through a through-hole 46 in the lid 45, through an adapted hole in the fully pre-wired printed circuit board assembly 51, and into a blind hole 43 in an integral post 42 of a support rib 41 in the base. While an assembly screw is used in this exemplary configuration, the lid may instead be secured to the base by other means, such as with adhesive, with epoxy, with integral plastic tabs or hooks which fit into recesses in the base side panels, or through plastic welding. For particular applications, such as where the improved housing assembly 30 needs to be completely sealed, one or more of these alternate lid attachment methods may be employed, and the morphology of the base and lid may change accordingly as necessary for adaptation to such alternative lid attachment methods.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

I claim:

1. A housing assembly for housing a fully pre-wired printed circuit board assembly, wherein the housing assembly comprises:
   a base comprising a bottom panel with integral perpendicular side panels extending from the edges of the bottom panel, wherein the base forms an interior;
   a first nipple included in a first select panel of the base panels, wherein:
      the first nipple is adapted to allow the housing assembly to be mounted to a first gang junction box; and
      the first nipple protrudes from the first select panel and does not extend into the interior of the base;
   a second nipple included in a second select panel of the base panels, wherein:
      the second nipple is adapted to allow the housing assembly to be mounted to a second gang junction box;
      the second nipple protrudes from the second select panel and does not extend into the interior of the base;
   a pre-wired printed circuit board with wires coupled thereto, wherein:
      the pre-wired circuit board is within the interior of the base;
      a first subset of the wires extends from the pre-wired printed circuit board through the first nipple; and
      a second subset of the wires extends from the pre-wired printed circuit board through the second nipple; and
   a lid substantially similar in dimensions to the of the bottom panel of the base, wherein the lid is adapted to be securable to the base at tops of side panels of the base.

2. The housing assembly of claim 1 wherein a height from centerlines of the first nipple and of the second nipple to the bottom panel of the base is up to 17.5 mm ($1^{1}/_{16}$ inches).

3. The housing assembly of claim 1 wherein a height from the bottom panel of the base to the tops of the side panels is up to 35.7 mm ($1^{13}/_{32}$ inches).

4. The housing assembly of claim 1 wherein a first side panel of the base couples an orthogonal second side panel of the base through a chamfer formed by a third side panel of the base, wherein the chamfer is at least a length of the second side panel.

5. A housing assembly for housing a fully pre-wired printed circuit board assembly, wherein the housing assembly comprises:
   a base comprising a bottom panel with integral perpendicular side panels extending from the edges of the bottom panel, wherein the base forms an interior;
   a first nipple included in a first select panel of the base panels, wherein:
      the first nipple is adapted to allow the housing assembly to be mounted inside a first gang junction box; and
      the first nipple protrudes from the first select panel and does not extend into the interior of the base;
   a second nipple included in a second select panel of the base panels, wherein:
      the second nipple is adapted to allow the housing assembly to be mounted to a second gang junction box;
      the second nipple protrudes from the second select panel and does not extend into the interior of the base;
   a pre-wired printed circuit board with wires coupled thereto, wherein:
      the pre-wired circuit board is within the interior of the base;
      a first subset of the wires extends from the pre-wired printed circuit board through the first nipple; and
      a second subset of the wires extends from the pre-wired printed circuit board through the second nipple; and
   a lid substantially similar in dimensions to the of the bottom panel of the base, wherein the lid is adapted to be securable to the base at tops of side panels of the base.

* * * * *